United States Patent [19]

Gaudriot et al.

[11] 4,281,551

[45] Aug. 4, 1981

[54] APPARATUS FOR FARFIELD DIRECTIONAL PRESSURE EVALUATION

[75] Inventors: Lionel Gaudriot, Lozanne; Michel Mercusot, Lyons, both of France

[73] Assignee: Societe pour la Mesure et le Traitement des Vibrations et du Bruit-Metravib, France

[21] Appl. No.: 114,972

[22] Filed: Jan. 24, 1980

[30] Foreign Application Priority Data

Jan. 29, 1979 [FR] France ................................ 79 02813

[51] Int. Cl.$^3$ ............................................. G01H 3/12
[52] U.S. Cl. .................................................. 73/647
[58] Field of Search ................. 73/645, 646, 647, 648; 179/1 R, 1 MN

[56] References Cited

U.S. PATENT DOCUMENTS 3,747,703  7/1973  Knowd et al. ......................... 73/648

OTHER PUBLICATIONS

A. J. Rudgers, "Determination of the Farfield Radiation of a Noise Source from Near Field Measurements Made with Trott Array", J. Acous. Soc. Am., vol. 53, No. 5, pp. 1411–1416, 1973.

R. W. Raymond, "Automatic Measurement of Sound Power Level without a Computer", Noise Control and Vibration Reduction, vol. 6, No. 4, pp. 124–127, Apr. 1975.

Primary Examiner—Stephen A. Kreitman
Attorney, Agent, or Firm—Arnold, White & Durkee

[57]  ABSTRACT

An apparatus for obtaining the farfield directional pressure intensity of a sonorous source placed in a fluid medium from pressure measurements taken in the nearfield of the source is disclosed. An acoustic antenna is placed in the nearfield of the source to map the acoustic pressure nearfield. The antenna consists of either a single receptor, or of two separate receptors, one fixed in position to define the direction and the other variable in position over the acoustic antenna. Each receptor is comprised of two oppositely facing parallel planar arrays of acoustic detectors separated by a predetermined distance. The detectors are arranged in each array in a predetermined matrix. The detector signals from both arrays are processed by either of two different methods, an additive or a multiplicative method, to obtain the farfield directional pressure intensity of the source.

20 Claims, 17 Drawing Figures

½ THE APERTURE ANGLE $\vec{P} = \frac{1}{S}\int_S P \cdot dS$
$\vec{V}_n = \frac{1}{S}\int_S V_n \cdot dS$
$I(\vec{k}_o) = (\vec{P} \cdot \vec{V}_n)_\epsilon$

EXAMPLE OF A
CONTROL SURFACE "E"

APPARATUS FOR FARFIELD DIRECTIONAL PRESSURE EVALUATION

BACKGROUND OF THE INVENTION

The present invention relates to the measurement of properties of an acoustic source placed in a fluid medium. More particularly, the invention relates to an improved apparatus for measuring the sources's farfield directional or total acoustic power from measurements taken in the nearfield of the source, and where the source may be either fixed or moving.

Up to now, the measurement of the farfield acoustic power of various sound sources has been very difficult to carry out whenever these sources have been fixed. Further, it has been next to impossible to obtain precise measurements when these sources are moving. The most frequently used solution by the prior art to obtain the farfield measurement of the source consists of placing the source in a stationary position in an open space, for example, in nature, and in measuring the farfield pressure with the aid of a microphone which one places at a specified distance from the source. These measurements are ackward and time-consuming if one wishes to obtain precise measurements since they require to operate with the microphone in many points. In addition, these measurements may be distorted due to the presence of other external sound sources.

Other prior-art solutions which produce precise measurements require one to place the source in an anechoic chamber (soundless chamber) which simulates a free acoustic space, or to the degree that one is content with the simple measurement of the total radiated acoustic power radiated without concern for the direction, one usually places the source in a reverberant chamber. The latter prior-art method allowing one to obtain a more rapid and a more precise measurement of the total power. All these methods are not entirely satisfactory, and in general, are time-consuming and require costly investments. More importantly, none of them can be used to obtain measurements of the farfield pressure when the source is moving.

For these reasons, it has already been proposed that one may obtain the total power parameter by direct measurement of the acoustic intensity by means of a pair of microphones which are placed succesively at a large number of points on the surface which surrounds the source or on the source itself. However, such a measuring device does not allow one to determine the direction in which acoustic energy is propagated. In addition, for measurements to be taken specifically under water, one has proposed the use of plane acoustic antennas made up of a plurality of hydrophones placed in a single plane, and which, from measurements taken in the nearfield, permits one to reconstitute the acoustic farfield (Trott Antennas). This technique is specifically described in the article by Anthony J. Rudgers appearing in the *Journal of the Acoustical Society of America,* Volume 53, No. 5, 1973 beginning at page 1411, and entitled "Determination of the Farfield Radiation of a Noise Source from Nearfield Measurements made with a Trott Array."

The present invention consists of a device which eliminates the disadvantages of the aforementioned devices and methods. Because, by means of measurements taken in the nearfield of the sonorous source placed in a fluid medium, the total and directional acoustic intensity resulting in the farfield may be obtained without the need to hypothesize about the nature of the source.

SUMMARY OF THE INVENTION

In accordance with the present invention, an apparatus for obtaining the farfield pressure intensity measurements in a given direction of a sonorous source which has been placed in a fluid medium from pressure measurements taken in the nearfield of the source is disclosed. The apparatus consists of an acoustic antenna that is positioned close to the source to measure the acoustic pressure generated in the nearfield by the source. Connected to the acoustic antenna is a processing unit which processes the acoustic signals generated by the antenna to construct the farfield directional pressure reading.

The acoustic antenna consists of at least one receptor for measuring the acoustic pressures at a given position in the nearfield of the source. In one aspect of the invention, only one receptor is used, and this receptor represents the entire acoustic antenna. In another aspect of the invention, two receptors are used to measure the nearfield pressures at two positions both representing the acoustic antenna. For this embodiment, to obtain the total farfield pressure intensity in a given direction, one of the receptors is fixed in position to define the chosen direction, and the other receptor is varied in position over the acoustic antenna field to completely map a nearfield chosen surface.

Each receptor of the antenna consists of two oppositely facing parallel planar arrays of acoustic detectors, such as omnidirectional pin-point microphones, in which the planar arrays are separated by a predetermined distance. The detectors in each planar array are positioned to form a predetermined matrix of detectors, such as a square matrix. The separation distance between the planar arrays is chosen to be equal to one quarter wave length of the maximum acoustic frequency signal to be measured, while for a square matrix, the square side separation distance on the individual detectors is chose to be equal to one-half the wave length of the maximum acoustic frequency to be detected. The detector signals generated in response to the acoustic pressure received on the detectors is applied to the processing unit for processing.

The processing unit processes the detector signals in one of two ways to achieve the directional farfield pressure generated by the source. The two methods are referred to as the additive and the multiplicative methods. The processing unit consists of a plurality of signal conditioning means with each signal conditioning means associated with a receptor for generating the farfield pressure intensity field contribution of the acoustic energy received by the receptor at that position in the acoustic antenna. To achieve the total farfield directional energy, a combining means is used to combine the output of the signal conditioning means for all of the positions of the acoustic antenna. The signal conditioning means and the combining means are different in the additive method than for the multiplicative method.

For the additive method, each signal conditioning means includes circuitry for generating a planar average pressure signal for each planar array derived from the summed together signals for each of the detectors. The planar average pressure signals for each of the planar arrays are then averaged together to produce the receptor average pressure signal representative of the average value of the acoustic pressure located between the planar arrays. The planar average pressure signals from each of the arrays are applied to a subtracting means to produce a difference signal representative of the average particle acceleration of the fluid. A means is also provided to generate the time derivative of the receptor average pressure signal. The derivative of the receptor average pressure signal is added to the average particle acceleration signal in a summation means to produce the farfield pressure intensity contribution for the acoustic energy received by the receptor in the chosen direction.

For the multiplicative method, the signal processing means includes similar circuitry for generating the planar average pressure signal, the receptor average pressure signal and the average particle acceleration signal. However, for this method, the average particle acceleration signal is integrated to obtain the average particle velocity of the fluid. A product averaging means is provided to obtain the time average value of the product of the average particle velocity signal and the receptor average pressure signal. The output from this means is the farfield pressure intensity contribution signal from the acoustic energy received by the receptor.

For one embodiment of the invention, two receptors are used to map the entire nearfield pressure intensity field of the source covered by the acoustic antenna by fixing in position one of the receptors and varying the position of the second receptor over the surface of the antenna. The signal produced by the signal conditioning means for the two receptors are combined in a slightly different way in the additive method than the multiplicative method. For the additive method, the output from the detector varying in position is time-delayed in a variable time delay generator, and the output from the delay generator combined with the output from the signal conditioning means for the stationary receptor in a combining means. The combining means is comprised of a multiplying means for generating the time average of the results of the multiplication of the farfield pressure contribution signals from both receptors. The output from the multiplying means is then applied to an adder that sums together the signals obtained at each of the various positions of the second receptor to form the total farfield pressure intensity of the source in the chosen direction.

For the multiplicative method, the output from the product average means for both receptors are combined in an adder that adds together the signals generated at the various positions of the second receptor to form the total farfield pressure intensity of the source in the chosen direction.

For either the multiplicative or the additive method of combining the receptor signals, electrical delay lines can be provided to delay the signal from a given detector or the signals from a group of detectors in a given planar array thereby generating an electrical rotation of the chosen direction of the farfield pressure intensity to be measured.

BRIEF DESCRIPTION OF THE DRAWINGS

For a fuller understanding of the nature and objects of the invention, reference should be had to the following detailed description taken in connection with the accompanying drawings, in which.

Similar reference characters refer to similar parts throughout the several views of the drawings.

DETAILED DESCRIPTION OF THE PREFERRED EMBODIMENT

In the following explanation, the expression "total power" will mean the average power radiated at a distance by the source and accrued in all directions; and, the expression "directional power" will mean that portion of the total power which is admitted in a definite solid angle around a given direction. The dimension of the solid angle thus defined and which will named "angle of resolution" will be explained below. The term "microphone" as used herein refers equally to any device which obtains acoustic information in an air or an acquatic medium.

Figure 1:
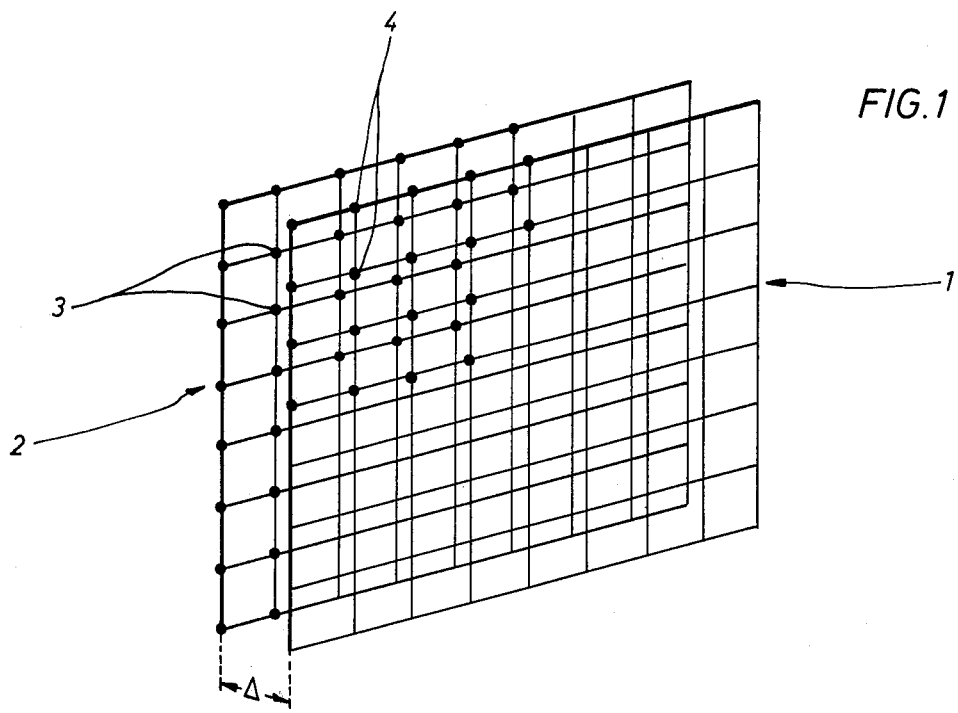
FIG. 1 is a perspective view of the planar arrays of the present invention showing locations of the pinpoint microphones.
Figure 2:
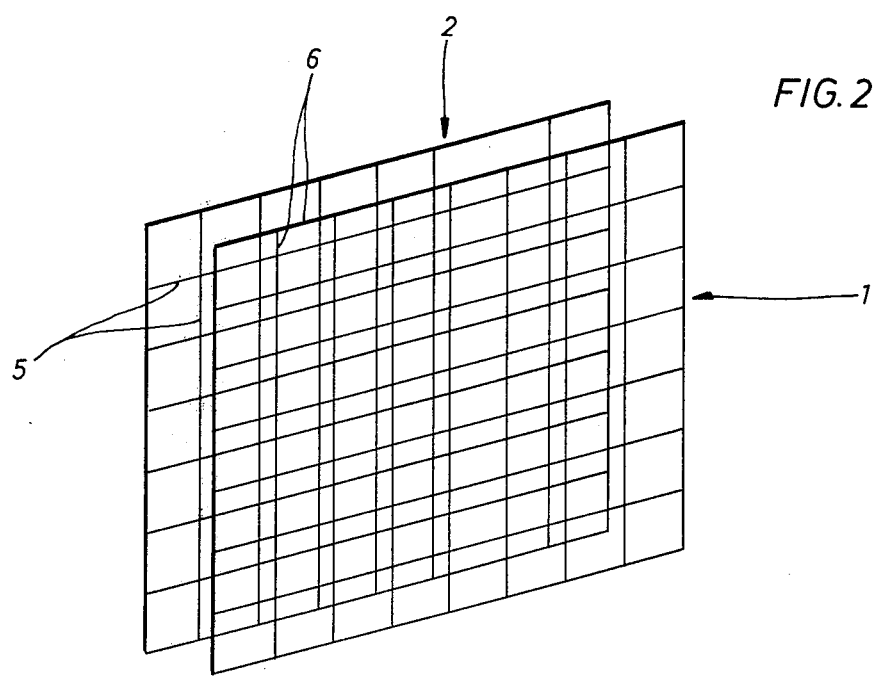
FIG. 2 is a perspective view of the planar arrays of the present invention showing the wires on which the microphones are mounted.
Figure 3:
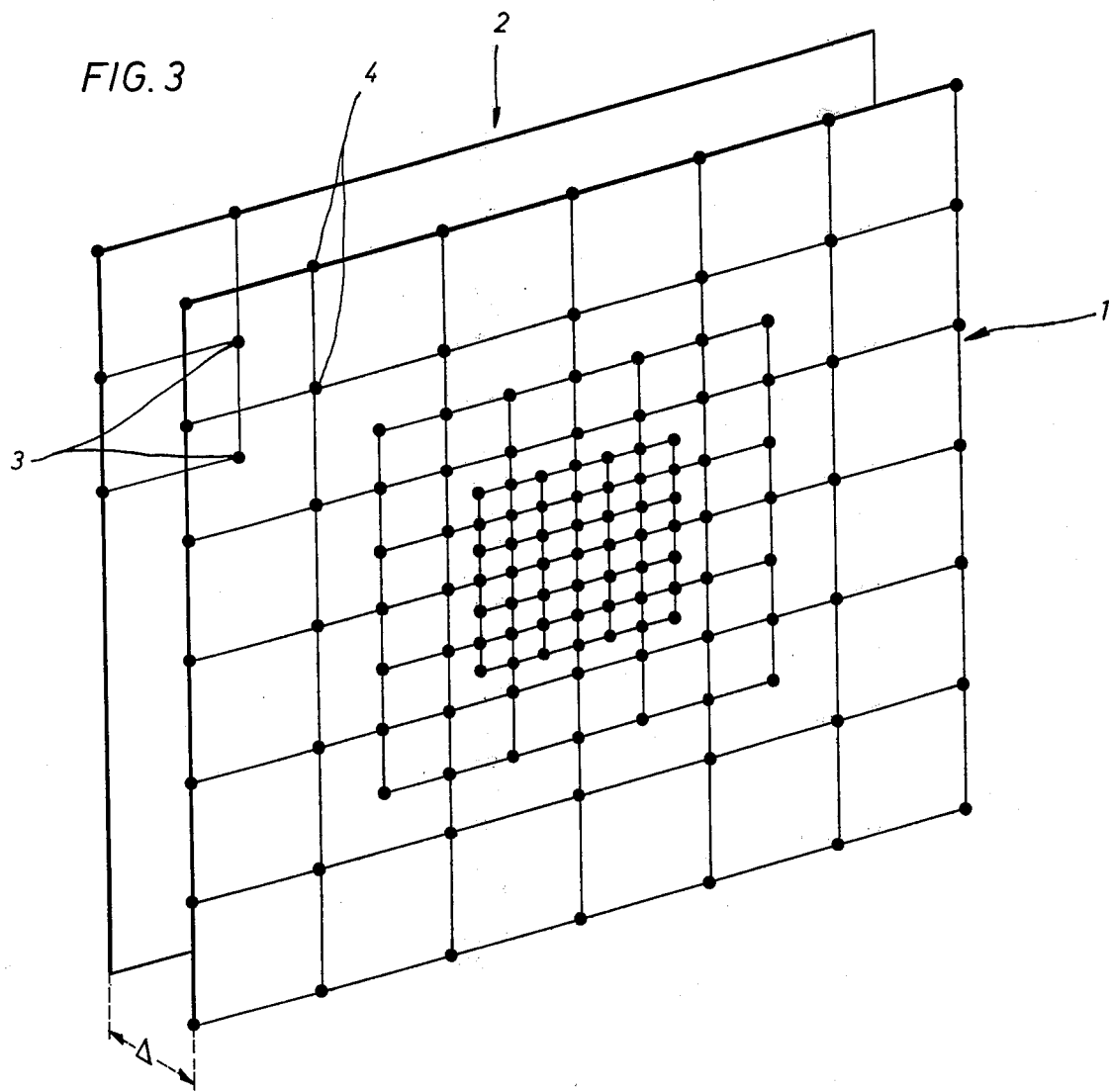
FIG. 3 is a perspective view of the planar arrays for the microphone detectors of the present invention showing a non-uniform distribution of the microphones over the arrays.

Referring now to the figures and first to FIGS. 1, 2 and 3, perspective illustrations of the planar receptors of the present invention are shown. Each receptor is comprised of two oppositely facing planar arrays of acoustic detectors arranged in a matrix in each of the arrays. For the preferred embodiment of the present invention, the acoustic detectors used in the planar arrays are omnidirectional pinpoint microphones of the "Electret" type. The microphones may be arranged in a matrix, such as that shown in FIG. 1 in which a square matrix is formed, or they may be distributed in a non-uniform manner over each planar array, such as that shown in FIG. 3. The planar arrays are separated by a separation distance Δ. This separation distance enables the present invention to determine the average particle acceleration of the fluid incident on the receptor.

Figure 6:
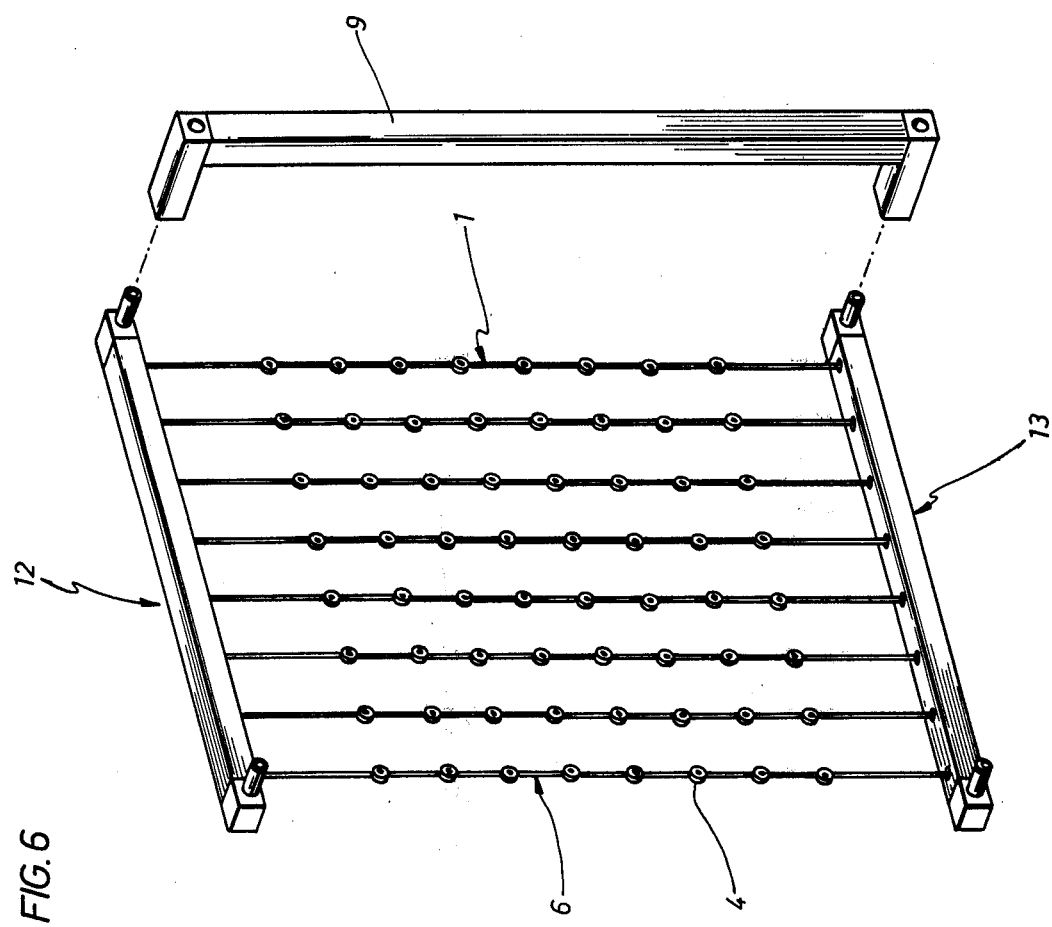
FIG. 6 is a perspective view of the construction of the planar arrays of detectors for the preferred embodiment of the present invention.
Figure 6:
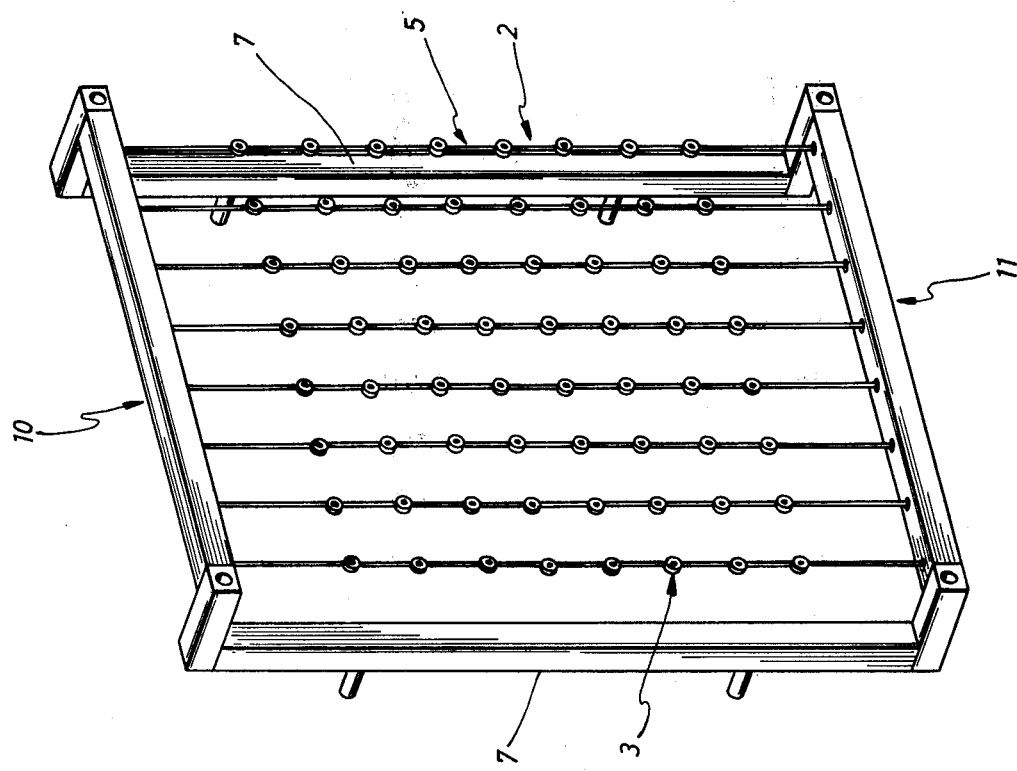

Referring now to FIG. 6, a cutaway perspective view of a receptor of the present invention is shown. The microphones that comprise planar arrays 1 and 2 are supported in the matrix by wires 5 and 6 that are attached to hollow transversals 10, 11, 12 and 13. Frame member 7 is attached to transversals 10, 11 to form a rigid assembly to support the planar array 2. Frame member 9, of which only one is illustrated in FIG. 6, is attached to hollow transversals 12 and 13 to complete the rigid assembly to support the microphones of planar array 1.

Figure 7:
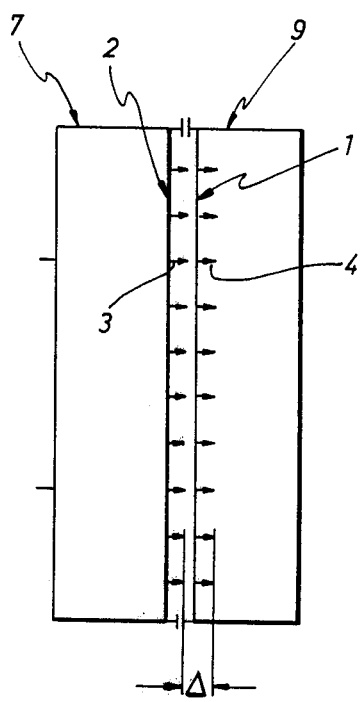
FIG. 7 is a side view representation for one possible configuration of the assembly illustrated in FIG. 6.
Figure 8:
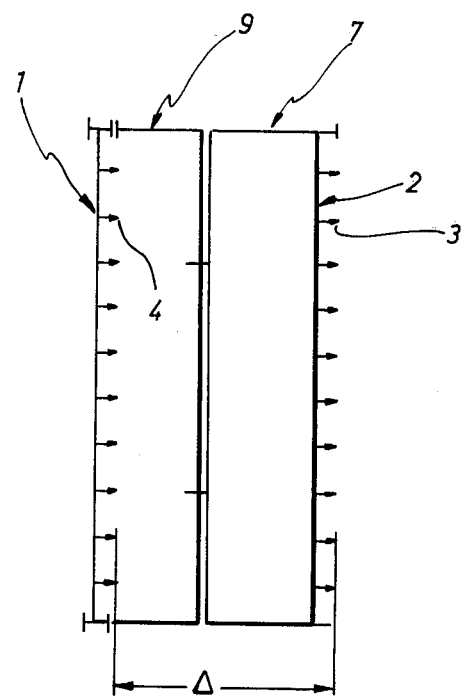
FIG. 8 is a side view representation of an alternate configuration of the assembly as shown in FIG. 6.

Turning now to FIGS. 7 and 8, two alternate configurations of the assemblies for planar arrays 1 and 2 are shown. FIG. 7 illustrates an arrangement for the minimum separation distance Δ between the planar arrays 1, 2, while FIG. 8 illustrates a maximum separation distance Δ. For the preferred embodiment, the distance between the planar array surfaces is, at most, a quarter of the length of the minimum acoustic wave observed where the difference operation between the average pressure for the planar arrays that yields the average paraticle acceleration is made in a direct way. For example, for the measurement up to 2500 Hz, the maximum distance is of the order of 30 mm. As previously mentioned, the acoustic detectors are held stationary with respect to each other in the planar arrays in a predetermined matrix that could be formed, either uniform or not, of rectangular, square, triangular, or irregular elementary pieces. In any case, the space between the microphones of the same set up of planar arrays determines the upper limit for the frequency of the acoustic signal to be detected. The minimum desirable set up for the space between the microphones of the same planar array is of the order of half the length of the acoustic wave of the highest frequency of the band to be analyzed whether the set up is regular or irregular. The lower frequency limit is not fixed by the receptors, other than by the lower cutoff frequency of the electronic response of the detectors (which for the preferred embodiment is approximately 20 Hz). Rather, the lower limit is determined by: (1) in the additive method, the relationship of the area covered by the antenna on the source, or by the fact that because of the use of two receptors, one stationary and one mobile, plus the evaluation of the interaction power between these two receptors, it is possible to extend the apparent surface of the planar antenna and (2) in the multiplicative method of processing, the angular resolution of the antenna which can equally be translated into dimensional terms by a relationship between the spread of the receptors E and the length of the acoustic wave to be considered.

Referring again to FIG. 6, for the preferred embodiment, microphones 3 and 4 are spaced 70 mm apart in order to work up to 2400 Hz and maintain by the use of one or two Kevlar wires extended between the transversals 10, 11 and 12, 13 of each of the planar arrays 1, 2. Each array has 64 microphones and an exterior dimension of approximately 50 cm by 50 cm.

It is preferable to have the ends of the wires 5, 6 (which support the microphones 3, 4) united within the interior of the hollow transversals 10, 11, 12 and 13 to facilitate connection of the detector leads to the electronic unit that will process the signals. The separation distance Δ between the planar arrays 1, 2 is a function of the scale of the analyzed frequencies and in which, in general, is between 20 mm and 200 mm for the range of frequencies 100 Hz-2500 Hz. The preferred embodiment of the present invention shows pin point microphones as the acoustic detectors, but is obvious to a person of ordinary skill that the microphones used to take the pressure measurements may be replaced by acoustic detectors that sense across an entire line or by a acoustically sensitive surface covering the entire planar array.

As previously mentioned, the present invention calculates the farfield pressure intensity in a given direction based on measurements taken in the nearfield of the radiating source. For the preferred embodiment, the present invention utilizes two receptors A, B (see FIG. 4) that are placed in proximity to a sound source, fixed or mobile, which is in a fluid medium. By means of double pressure measurements taken on the two oppositely facing planar arrays of acoustic detectors in the nearfield acoustic pressure field, it is possible to specifically determine: (1) the active power emitted around the directions chosen by electric or geometric positioning of the detectors of the receptors, (2) the total active power by summation of the directional data. In this way, one may obtain an energetic reconstitution of the distant acoustic field by the use of proven theoretical formulas and principles which include the Principle of Huygens and the integral formula of Helmholtz.

For the additive method of calculating the farfield pressure intensity, it is possible, according to the Principle of Huygens by way of the sloping of the integral representation of Helmholtz, to reconstitute the acoustic field on the exterior of a closed surface E, which surrounds the sources, by the summation of the effects of the elemental sources distributed over E.

These elemental sources are of two types: (1) movement sources (or monopolars) characterized by $\gamma(t)$, the particle acceleration, or (2) effort sources (or dipolars) characterized by P(t), the acoustic pressure. The expression of the pressure on the outside of E is expressed by:

$$P_M(\bar{z},t) = \frac{1}{4\pi} \int_E \frac{1}{1z)} (P_0\gamma_n(\bar{y}) + \frac{1}{c} \frac{\partial P}{\partial t} (\bar{y})\cos\theta)(t - \frac{\bar{z}}{c}) dS$$

This formula permits one to calculate the pressure at any given point M located at a distance from the source. Since our mathematical discussion has now made reference to a distant field, it is now appropriate to explain the mathematical notion of power or the acoustic intensity I expressed as:

$$I = \frac{P^2}{\rho c}$$

Figure 10:
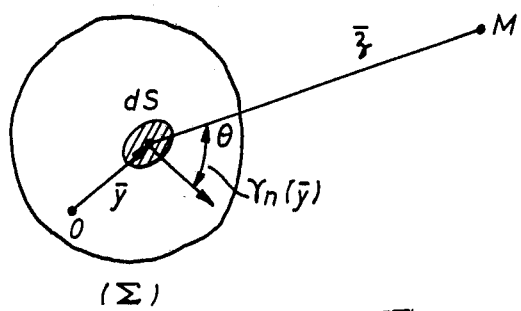
FIGS. 10–13 illustrate the mathematical justification for the measurements obtained through the present invention.
Figure 11:
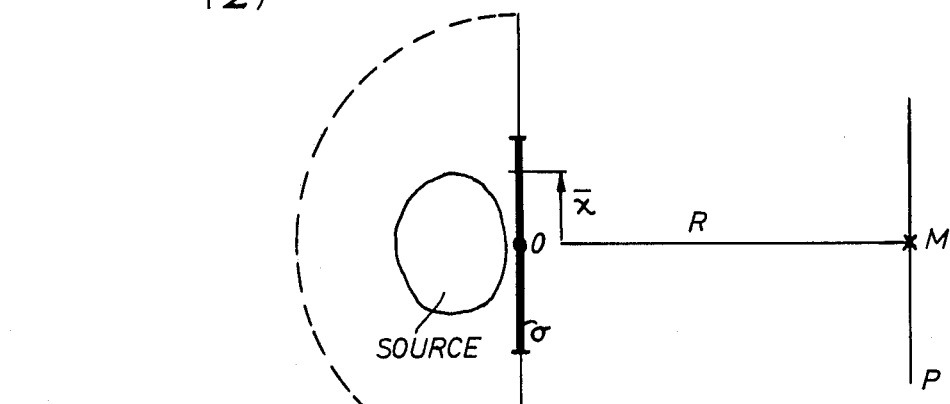

Referring to FIGS. 10 and 11, it is possible to perform this operation with the measurement of the particle acceleration and pressure on a closed surface E, chosen in a particular way, to the extent that the closed surface is is formed by a plane $\pi$ which is closed around the source by a sphere S extending to infinity. The choice of this sursurface E corresponds to the particular case which includes plane receptors as previously described. It is possible to envision other choices, but only at the expense of the electronic processing that must occur.

In this situation, one might agree that at a point M of a plane P parallel to the plane $\pi$, situated on a normal to the plane $\pi$ and located at distance R from the source, the pressure would be:

$$P(R,t) = \frac{1}{4\pi R} \int_\sigma \left[ P_0\gamma(\bar{x}) + \frac{1}{c} \frac{\partial P}{\partial t}(\bar{x}) \right] (t - \frac{R}{c}) dS$$

This result is justified by two arguments: First, the contribution at point M of the sources situated on S tends toward 0 when $R \to \infty$ (propagation of the energy towards the exterior). Second, one can physically show that the contributions of the imaginary sources along $\pi$ tend to decrease the further one is from the source. Under these conditions, a "useful area" appears on $\pi$ called $\sigma$ whose size is a function of the breath of the coherent zones of the source field relative to the breath of the source. Nevertheless, in the majority of cases, the size of $\sigma$ is of the order of the magnitude of this source. That is, the source must be "covered". Under these conditions, one would agree that in reality, zone $\sigma$ in question on plane $\pi$ is of a sufficiently small size in front of R that the acoustic waves from the elemental sources situated in this zone are plane in point M and parallel to P. This means that the surface $\sigma$ in question on plane $\pi$ is, viewed from M, contained in a small solid angle.

Under these conditions, one may agree that in M, one detects the elemental contributions of the sources located on the surface, normal to plane $\pi$, from where we arrive at the suppression term $\cos\theta$, and the assumption that the travelling time for the acoustic wave from all of the points of the surface are equal.

Figure 12:
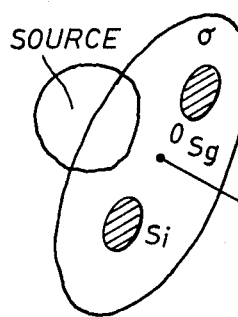
Figure 13:
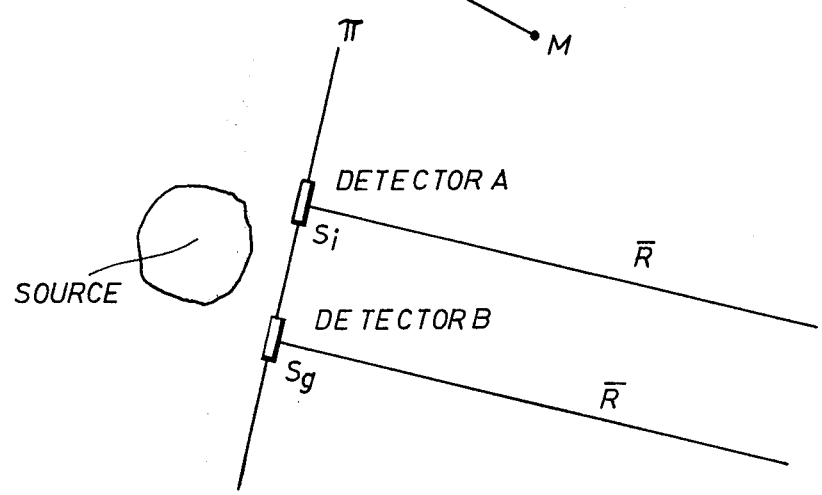

According to the invention, and as illustrated in FIGS. 12 and 13, one arrives at a partial description of the plane $\pi$ by means of the two receptors which cover the elemental surfaces $S_i$, $S_j$ (see FIG. 12) where the dimensions are defined at the same time by the parameters bound to the physics of the phenomenon, and by the parameters of the type of equipment to be used. This partition is not imperative, but it opens the possibility for a discussion of radiation mechanisms.

Therefore, in this case, one would write:

$$P(R,t) =$$

$$\sum_i \left\{ \frac{1}{4\pi R} \int_{S_i} \left[ P_0\gamma\left(\bar{x}, t - \frac{R}{c}\right) + \frac{1}{c} \frac{\partial P}{\partial t}\left(\bar{x}, t - \frac{R}{c}\right) \right] dS \right.$$

$$= \sum_i \left\{ \frac{1}{4\pi R} \int_{S_i} F\left(\bar{x}, t - \frac{R}{c}\right) dS \right.$$

To the degree that data from positions $S_i$ which describes $\sigma$ are not known at the same time, it will be necessary to consider a statistical approach to the average power:

$$<P^2(R,t)>_t = \frac{1}{16\pi^2 R^2} < \left\{ \sum_i \int_{S_i} F\left(\bar{x}, t - \frac{R}{c}\right) dS \right\}^2 >_t,$$

where the symbol $<\ >_t$ means the temporal averave value. Thus, $$<P^2(R,t)>_t = \frac{1}{16\pi^2 R^2} \left\{ \sum_i < \left[ \int_{S_i} F\left(\bar{x}, t - \frac{R}{c}\right) dS \right]^2 >_t + \right.$$

$$2 \sum_{i,j} < \left[ \int_{S_i} F\left(\bar{x}, t - \frac{R}{c}\right) dS \right] \cdot$$

$$\left[ \int_{S_j} F\left(\bar{x}, t - \frac{R}{c}\right) dS \right] >_t.$$

Consequently, the operating procedure for the present invention is as follows: First, the angular setting of the first receptor on a surface $S_i$ defines the direction for evaluation of the distant pressure field. This manipulation may be completed either by actual rotation of the receptors, or by an imaginary rotation with the aid of electrical delay lines and the balancing in the $\cos\theta$ of the pressure sources. Second, the electronic device attached to the receptors according to the present invention derives:

$$<P_i^2(t)>_t = K < \left[ \int_{S_i} F\left(\bar{x}, t - \frac{R}{c}\right) dS \right]^2 >_t,$$

where K is a conventionally defined constant term which is proportional to the partial power relative to the surface $S_i$ in the chosen direction. The temperal signal $P_1(t)$ is, of course, known.

The investigation of the neighboring positions $S_j$ with the help of the second receptor thereby allows us to determine the interaction power between the contributions of $S_i$ and $S_j$. The second receptor is located in the same plane as $S_i$. Therefore, $$<P_{ij}^2(t)>_t = K < \int_{S_i} F(\bar{x},t) \cdot \int_{S_j} F(\bar{x},t) >_t.$$

Third, the additive process continues by the iterative displacement on $\sigma$ of the first receptor in another position $S_i$ and the repetition of the previous two operations.

The combination of the positions $S_i$, $S_j$ must permit the total coverage of the surface $\sigma$ previously defined, a coverage which reserves the possibility for determining the sum of the products.

Fourth, the method continues with the summation of the different terms $<P_i^2>_t$ and $<P_{ij}^2>_t$ which is the density of the power around the normal direction at $\pi$ or at a rotated angle $\theta$ if one uses electronic rotation.

Fifth and finally, rotation of the receptors is done in order to evaluate other angles with the integration of all points of these power densities allowing one to calculate the total power in the farfield.

It should be noted, that the choice of the size of the receptors (which is made by the user) is such that if a single receptor covers the source, then the manipulations as explained in the second, third and fourth steps of the additive method discussed above are superfluous and a single receptor is sufficient. Also, certain practical procedures will alleviate the need for operations as defined in the second and third steps since the definition offered here is a strict definition. Finally, the value of the so-called "angle of resolution" $\psi$ which defines the assumed angular tolerance as a function of the relative breath e of the receptor (real size or imaginary size in the case of two receptors) and of the length of the acoustic wave, and is maximized at $$\psi \sim 2 \text{ Arc Sin } (\lambda/e).$$

Figure 15:
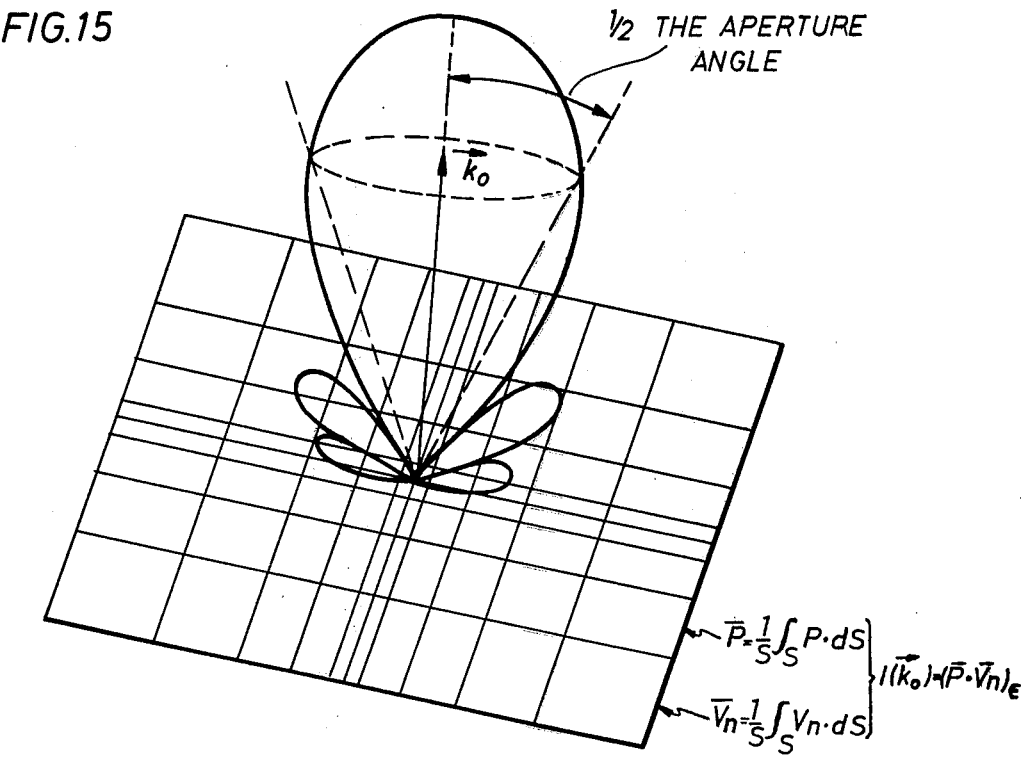
FIGS. 15–16 illustrate the operation of the multiplicative procedure for data processing by the present invention.
Figure 16:
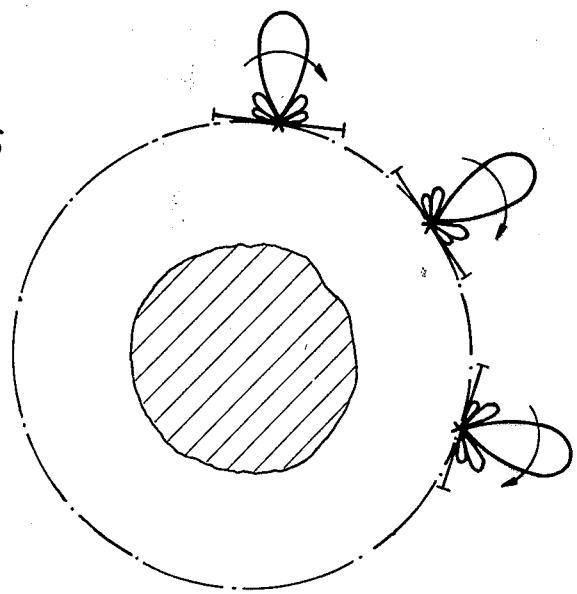

FIGS. 15 and 16 illustrate the physical justification for the multiplicative method of processing as per the present invention. If one refers to these figures, and if one is located near an acoustic source and if one calculates, as explained by means of a receptor as previously described, the average pressure on the surface of the receptor and the average velocity of the acoustic signal, one is able to form the temporal average product $<P(t) \cdot \overline{V}_n(t)>_t$, which represents, see FIG. 15, therefore, the average acoustic intensity propagated around the normal direction to the receptor, or another direction artificially created by electronic delays in a solid angle based on a relation with E and the dimension of the antenna at $\lambda$, the acoustic wave length. In the multiplicative method, the operative procedure is the following and may be satisfied by the use of a single receptor:

(1) The placement of the receptor near the source and calculation in this position of the average product $$<P(t) \cdot V_n(t)>_t;$$

(2) Investigation of alternative directions by electronic or mechanical rotation of the receptor (this leads to a local directional diagram);

(3) Repetition of this manipulation at a certain number of points around the source (see FIG. 16); and finally (4) The addition of these diagrams, direction-by-direction, one arrives at, after multiplication by the value of the surface E, the total power emitted in the angle of resolution and around the chosen direction. This magnitude is completely comparable except for a distance coefficient to the magnitude obtained by the first additive processing method. When expressed as a RMS value.

One can likewise evaluate the average impedance on the plane of the receptor:

$$<P>\bar{x}/<V>\bar{x}.$$

Figure 17:
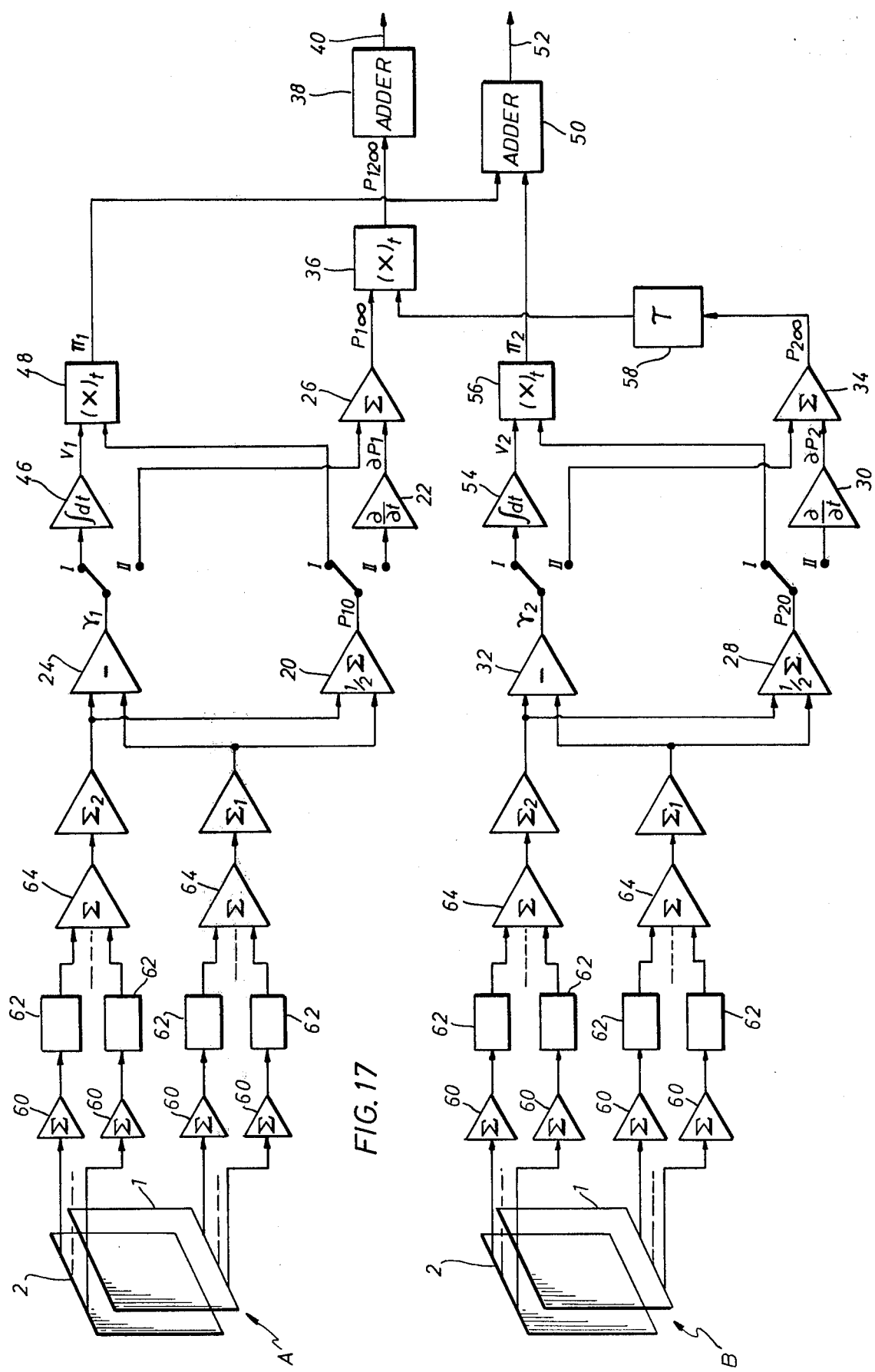
FIG. 17 illustrates an alternate embodiment of the present invention in which electrical rotation of the desired direction of the farfield pressure to be calculated is achieved through the use of electrical delay lines.

By the use of delay lines such as those represented in FIG. 17, one can obtain the electric rotation of the calculation directions without physically having to move the receptors.

Turning now to FIGS. 4, 5, 9 and 17, electrical block diagrams of the processing unit of the present invention according to the formula $$P\left(R, t + \frac{R}{c}\right) = \frac{1}{4\pi Rc} \int_\sigma \left[ P_o c \gamma(\bar{x}, t) + \frac{\partial P}{\partial t}(\bar{x}, t) \right] dS$$

are shown.

Figure 14:
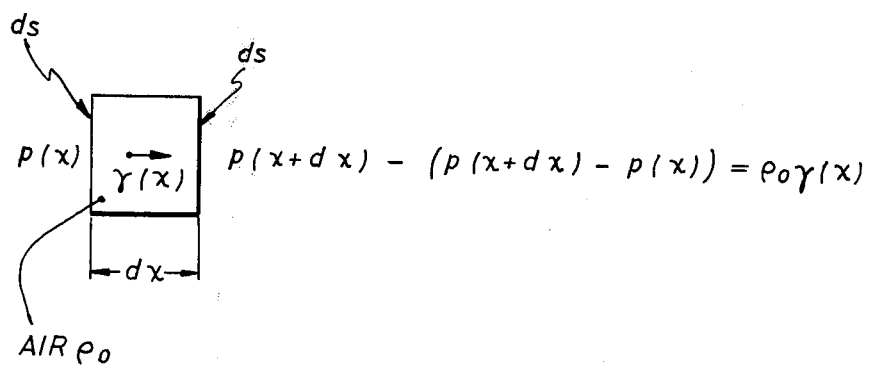
FIG. 14 is a schematic diagram of the evaluation of the acceleration of the fluid particles with simple pressure measurements.

The receptors of the present invention must offer two sets of data at its surface, the acoustic pressure in order to calculate the temporal derivative, and the normal particle acceleration at the plane. For this reason, the receptors are constructed as previously explained of a group of omnidirectional microphones placed according to a predetermined matrix and forming a network with a base formed by rectangles, squares or triangles or irregular shapes. In addition, these microphones are placed in two separate parallel planes which allow for the evaluation of the acceleration of the fluid particles with simple pressure measurements (see FIG. 14). Each receptor delivers two signals representing the sums $\Sigma_1$ and $\Sigma_2$ respectively, from planar arrays 1 and 2.

Basic to both the additive and the multiplying method of obtaining the farfield pressure measurement are:

$$\alpha(\Sigma_1 - \Sigma_2) \tag{1}$$

which is the representation of the spacial average of the normal particle acceleration at the receptor plane, and $$\tfrac{1}{2}(\Sigma_1 + \Sigma_2) \tag{2}$$

which is the representation of the spacial average of the pressure in a plane located between the two planar arrays.

The processing unit of the present invention obtains from the signals of each of the receptors the following:

(1) the planar average pressure for each receptor planar array $\Sigma_1$ and $\Sigma_2$;

(2) the receptor average pressure for each planar array of each receptor $P_{10}$, $P_{20}$;

(3) the average particle accelerations for the plane of each receptor $\gamma_1$, $\gamma_2$;

(4) the average particle velocity for the plane of each receptor $V_1$, $V_2$;

(5) the derivative of the receptor average pressure for each plane of each receptor $$\frac{\partial P_1}{\partial t}, \frac{\partial P_2}{\partial t};$$

(6) the distant surface pressure contributions covered by each receptor $P_{100}$, $P_{200}$; and (7) the inneraction powers from the two receptors $<P_{100} \cdot P_{200}>_t$.

In the case of the multiplicative method, the magnitudes $P_{10}$ and $V_1$ or $P_{20}$ and $V_2$ allows us to obtain an energetic representation of the distant acoustic field by deriving the temperal average products $<P_{10} \cdot V_1>_t$ or $<P_{20} \cdot V_2>_t$ which represent the acoustic intensity crossing the surface of the receptor (1 or 2) and which is propagated around the direction which is perpendicular to the plane of the receptor, or in another direction if delay lines are used to delay the detector signals (see FIG. 17).

Figure 4:
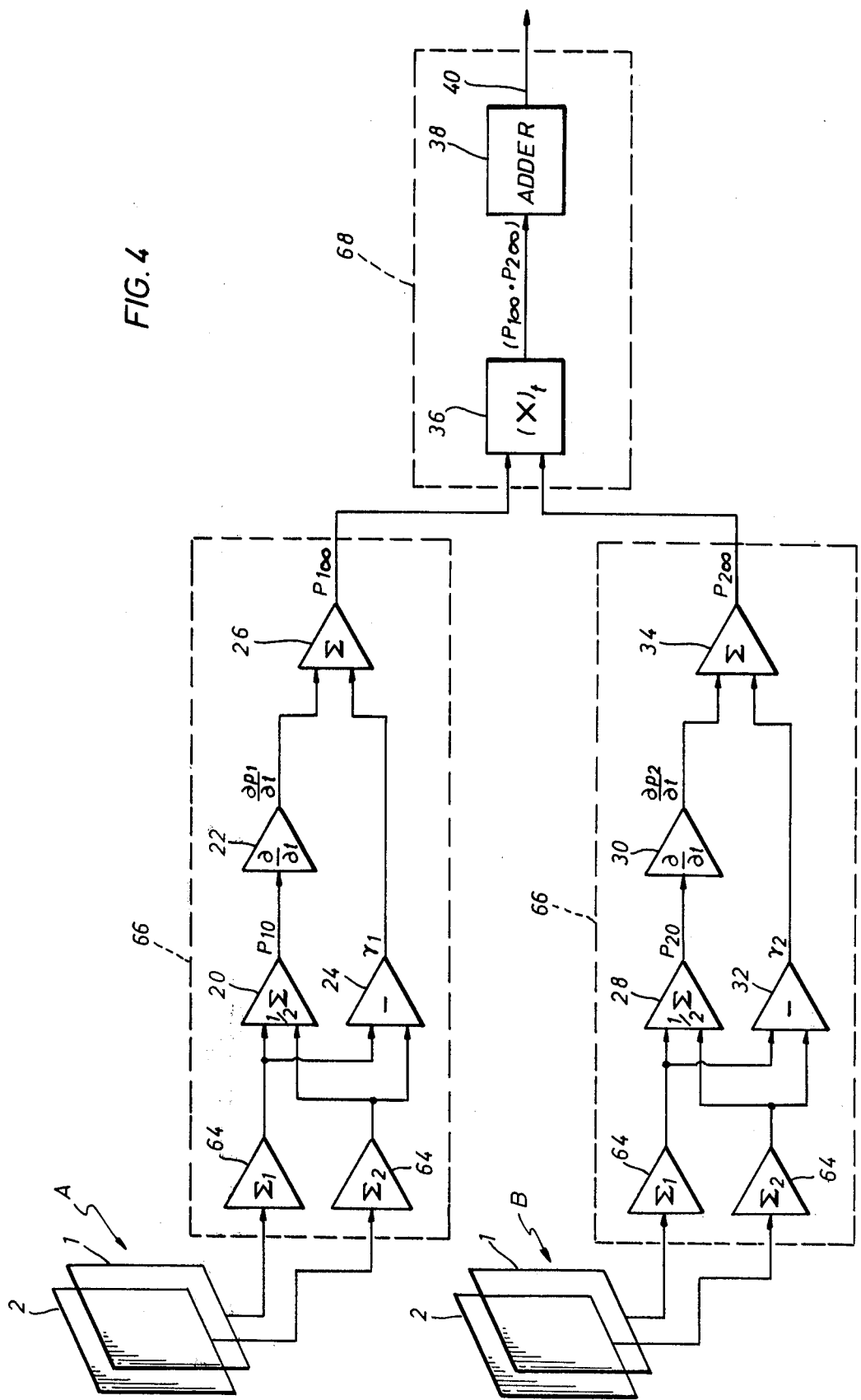
FIG. 4 is a block diagram representation of the additive method of obtaining the farfield pressure intensity in a given direction using two receptors.

Referring now to FIG. 4, a schematic electrical block diagram of the additive method of obtaining the farfield pressure intensity is shown. Two receptors A and B are each shown connected to a signal conditioning means 66. Both means 66 process the detector signals in identical manners and only one will be described herein. For the additive process, one of the receptors A will be fixed in position thereby to define the chosen direction for which the far field pressure intensity is to be measured, while the other receptor B is varied in position over the nearfield pressure field to obtain the various readings needed to construct the total farfield pressure intensity. The block diagrams illustrated in FIG. 4 describe mathematical functions that are performed on the signals, and the circuits used to perform these functions are well known in the art and thus are not described herein.

The signal conditioning means 66 receives the detector signals from each of the planar arrays. Each array inputs its signals into an adder 64. Adder 64 obtains the average planar pressure signal $\Sigma_1$ and $\Sigma_2$ for each of the planar arrays. These two signals are inputted to both a means for generating the receptor average pressure signal 20 and a subtracting means 24. The output of means 20 is the receptor average pressure signal $P_{10}$ measured on a plane between the two planar arrays. The receptor average pressure signal $P_{10}$ is applied to differentiator 22 which forms the time derivative of the receptor average pressure signal $P_{10}$ and applies that signal to summation means 26. The output from the subtracting means 24 which represents the average particle acceleration of the fluid $\gamma_1$ is also applied to summation means 26. The output of summation means 26 is the farfield pressure intensity contribution $P_{100}$ due to the pressure received by receptor A.

In a similar manner, signal conditioning means 66 attached to receptor B provides an output signal $P_{200}$ representative of the farfield pressure intensity from the nearfield pressure measured by receptor B. The outputs from the signal conditioning means 66 are inputted to combining means 68 for the additive method to produce the total farfield pressure intensity. Combining means 68 includes a multiplying means 36 which forms the product of the pressure intensity from the signal conditioning means 66 and takes the time average to obtain $<P_{100} \cdot P_{200}>_t$. This signal is inputted to adder 38 which integrates the pressure intensity signals for all of the positions of the movable receptor to produce the farfield pressure in the chosen direction.

Figure 5:
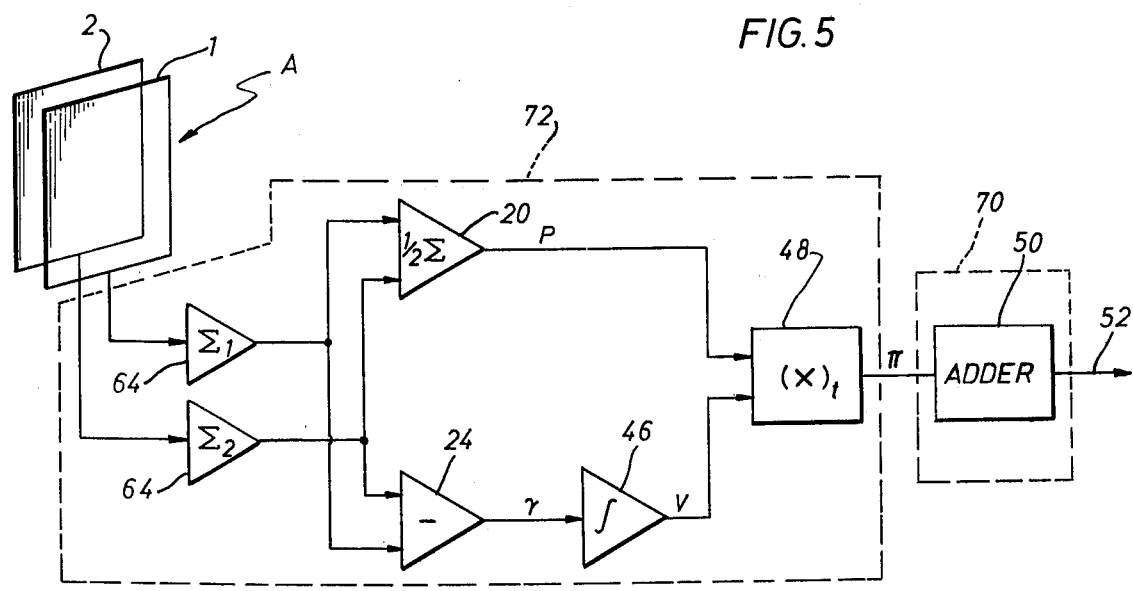
FIG. 5 is a schematic block diagram of the multiplicative method of obtaining the farfield pressure intensity in a given direction using a single receptor.

Turning now to FIG. 5, a schematic block diagram of the multiplicative method of obtaining the farfield pressure intensity in a chosen direction is shown. Receptor A is shown connected to the signal conditioning means 72 for the multiplicative method. The multiplicative method signal conditioning means 72 obtains the receptor average pressure $P_{10}$ signal and the average particle acceleration signal $\gamma_1$ in the same manner as previously discussed with regard to the additive method signal conditioning means 66. However, the average particle acceleration signal $\gamma_1$ is further integrated by integrator 46 to produce the average particle velocity signal $V_1$ that is combined in product averaging means 48 with the receptor average pressure signal $P_{10}$. Product averaging means 48 forms the product of the average velocity $V_1$ and the average pressure $P_{10}$ and takes the time average to obtain the farfield contribution for the pressure by the receptor. The output from signal conditioning means 72 is applied to combining means 70 for the multiplicative method. Combining means 70 consists of an adder 50 that forms the sum of the farfield pressure intensity contributions for all of the positions of the receptor in the nearfield to obtain the total farfield pressure intensity signal in a chosen direction.

Figure 9:
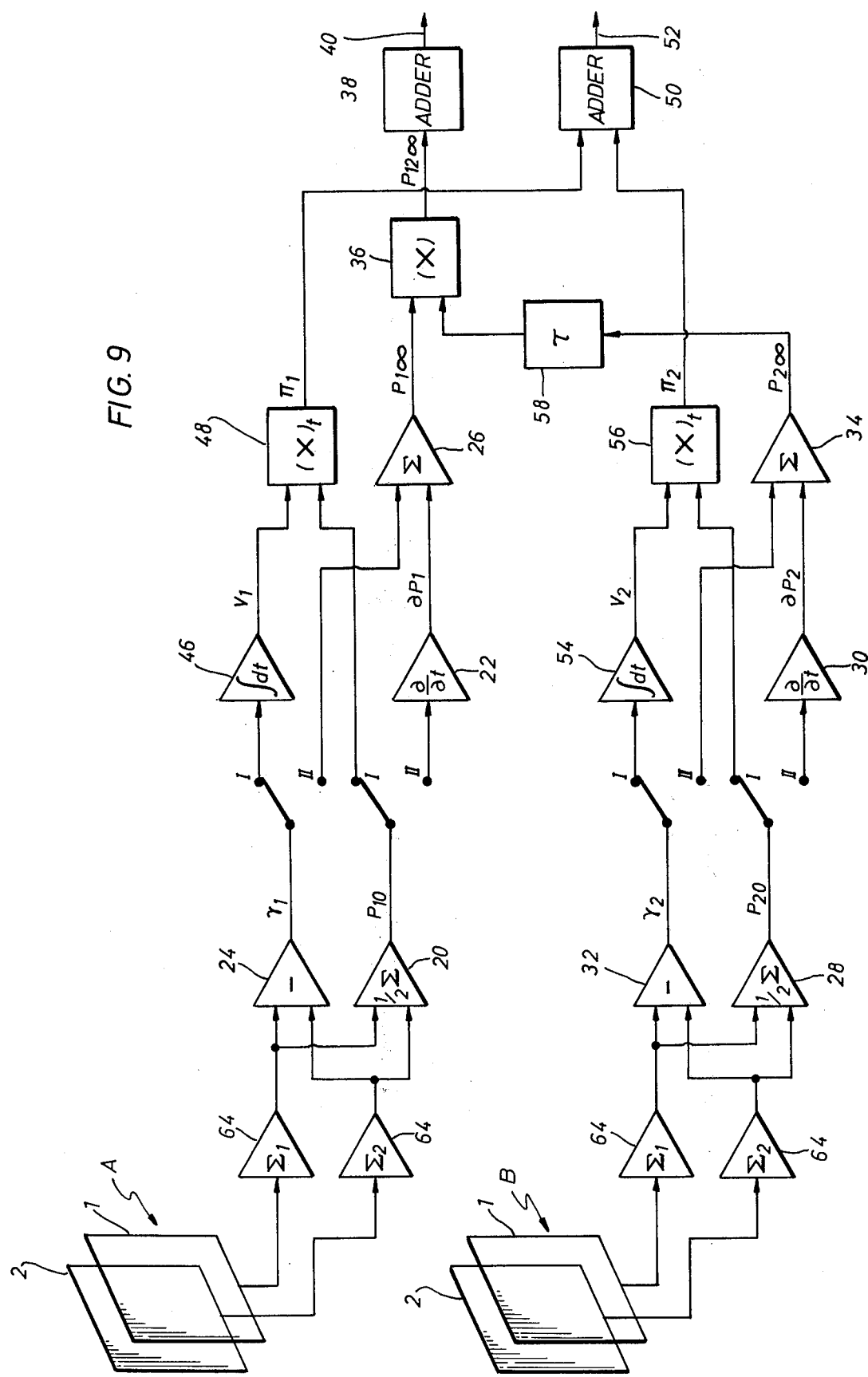
FIG. 9 is a schematic block diagram for the processing unit capable of processing both the multiplicative and the additive method for the present invention.

Referring now to FIG. 9, a processing unit of the present invention incorporating both the multiplicative and the additive method of obtaining the farfield pressure intensity is shown. By switch selection, it is possible to select which of the two methods is to process the receptor signals and to obtain the final results. It is possible to compensate for receptors which are out-of-phase by the use of a delay line 58, thus permitting the taking of measurements by staggered receptors. Variable delay unit 58 is used for phase compensation for detectors that are located at different distances from the source. This is useful in the case of the choice of a surface to be measured which is made of portions of out-of-phase planes, and in view of the search for a surface or even finding the shape of a machine or to evaluate the apparent phase speed, etc.

Turning now to FIG. 17, a further alternate embodiment of the present invention is shown in which electrical rotation of the chosen direction for which the farfield pressure intensity measurement is to be made is possible through the use of electronic delay lines interposed between the detector signals and the summation unit 64. By choosing single detectors or groups of detectors within in a given planar array, it is possible to delay these signals in such a way as to achieve an imaginary rotation of the chosen direction over the pressure measurement. Delay lines 62 are shown attached to the output of summing units 60 that sum together single or groups of detectors within the two receptor planar arrays.

According to the present invention, it is possible to obtain the strict construction of a radiation diagram from any source by means of nearfield measurements, and to anoaate, by means of physical practical rules the zone covered by the antenna with opposing source zone (part of field in coherence) and from that, to form the hierarchy or partial contributions of these zones in a given direction.

It is particularly appropriate for the analysis of the acoustic radiation characteristics of stationary sources and likewise convenient for the analysis of the characteristics of moving sources (for example, sources tied to a vehicle) and may be easily adapted for work in liquid currents or for taking measurements on moving vehicles with antennas attached.

In describing the invention, reference has been made to a preferred embodiment. However, those skilled in the art and familiar with the disclosure of the invention may recognize additions, deletions, substitutions or other modifications which would fall within the purview of the invention as defined in the appended claims.

What is claimed is:

1. An apparatus for obtaining the farfield pressure intensity measurement in a given direction of a sonorous source placed in a fluid medium from pressure measurements taken in the nearfield of the source, the apparatus comprising:

(a) an acoustic antenna positioned close to the source and responsive to the acoustic pressure generated in the fluid by the source, for measuring the pressure generated by the source in its nearfield, said antenna having at least one receptor, each receptor of said antenna including two oppositely facing parallel planar arrays of acoustic detectors, each detector generating a detector signal, said planar arrays separated by a predetermined distance, and where said detectors in each said planar array of detection are positioned to form a predetermined matrix of detectors, said receptors positionable within said antenna to map the nearfield of the source; and (b) a processing unit connected to said antenna and responsive to the detector signals for processing the detector signals, said processing unit including, (1) a plurality of signal conditioning means, each signal conditioning means connected to a receptor and responsive to the detector signals, for generating the farfield pressure intensity field contribution of the acoustic energy received by each receptor; and (2) a combining means responsive to the outputs from said plurality of signal conditioning means, for combining the farfield pressure intensity contribution signals from each receptor at each position used to map the nearfield of the source, the output from said combining means comprising the farfield pressure intensity in a given direction.

2. The apparatus according to claim 1 wherein each said signal processing means comprises:
  (a) a means responsive to the detector signals, for generating a planar average pressure signal for the acoustic energy received by each planar array of detectors, each planar average pressure signal derived from the summed together detector signals for the planar array;
  (b) a means responsive to the planar average pressure signals for generating a receptor average pressure signal representative of the average value of the acoustic pressure between the planar arrays of the receptor;
  (c) a means for generating the time derivative of the receptor average pressure signal;
  (d) a subtracting means responsive to the planar average pressure signals, for generating the difference between the planar average pressure signals, the output signal from said subtracting means representative of the average particle acceleration of the fluid; and
  (e) a summation means for summing together the derivative of the receptor average pressure signal, and the average particle acceleration signal, the output from said summation means comprising the farfield pressure intensity contribution for the acoustic energy received by the receptor.

3. The apparatus according to claim 2 wherein said antenna includes first and second receptors, said first receptor fixed in a position that defines the direction of the farfield pressure intensity to be measured and said second receptor varying in position, and wherein said combining means comprises:
  (a) a multiplying means connected to the outputs from said signal conditioning means connected to said first and second receptors, for generating the time average of the results of the multiplication of the farfield pressure contribution signals from each receptor; and
  (b) an adder, for adding together the output signals from said multiplying means obtained at each position of said second receptor, the added together signals forming the farfield pressure intensity of the source in the chosen direction.

4. The apparatus of claim 3 wherein said summation means associated with said second receptor further includes a time delay generatory for time delaying the output signal from said summation means, said time delay providing phase compensation between said first and second receptors when said receptors are at different distances from the source.

5. The apparatus according to claim 1 wherein each said signal processing means comprises:
  (a) a means responsive to the detector signals, for generating a planar average pressure signal for the acoustic energy received by each planar array of detectors, each planar average pressure value derived from the summed together detector signals for the planar array;
  (b) a means responsive to the planar average pressure signals, for generating a receptor average pressure signals representative of the average value of the acoustic energy between the planar arrays of the receptor;
  (c) a subtracting means responsive to the planar average pressure signals, for generating the difference between the planar average pressure signals, the output signal from said subtracting means representative of the average particle acceleration of the fluid;
  (d) an integrator, for integrating the average particle acceleration signal to obtain the average particle velocity; and
  (e) a product averaging means, for obtaining the time average value of the product of the average particle velocity signal and the receptor average pressure signal to obtain the farfield pressure intensity contribution signal from the acoustic energy received by the receptor.

6. The apparatus according to claim 5 wherein said antenna includes first and second receptors, said first receptor fixed in a position that defines the chosen direction of the farfield pressure intensity to be measured, and said second receptor varying in position, and wherein said combining means comprises an adder, for adding together the output signals from said product averaging means obtained at each position of said second receptor, the added together signals forming the farfield pressure intensity of the source in the chosen direction.

7. The apparatus according to claims 1, 2, 3, 4, 5 or 6 wherein each said signal conditioning means further includes a plurality of electrical delay lines, for electrically time delaying the detector signals for a detector or groups of detectors in a given plannar array thereby generating an electrical rotationof the chosen direction of the farfield pressure intensity to be measured.

8. The apparatus according to claim 1, 2, 3, 4, 5 or 6 wherein said acoustic detectors are pinpoint microphones.

9. The apparatus according to claim 8 wherein said planar arrays of microphones of said receptors form between themselves regular three dimensional parallelepipedic pieces.

10. The apparatus according to claim 8 wherein the separation distance between the parallel planar arrays is variable, said separation distance varied as a function of the frequency band of the analyzed source.

11. The apparatus according to claim 10 wherein said microphones are omnidirectional.

12. The apparatus according to claim 10 wherein said separation distance is at most one-quarter of the length of the minimum observed acoustic wavelength of the signal transmitted by the source.

13. The apparatus according to claim 8 wherein the predetermined matrix of microphones in each parallel planar array is a square matrix in which the square side distance between microphones is one-half of the minimum observed acoustic wavelength of the signal transmitted by the source.

14. The apparatus of claim 1 wherein one receptor represents the acoustic antenna.

15. The apparatus of claim 1 further including a storage battery for the self-contained portable operation thereof.

16. An apparatus for obtaining the farfield pressure intensity field in a given direction of a sonorous source placed in a fluid medium from pressure measurements taken in the nearfield of the source, the apparatus comprising:

(a) an acoustic antenna positioned close to the source and responsive to the acoustic pressure generated in the fluid by the source, for generating electrical signals characteristic of the pressure produced by the source in its nearfield, said antenna having first and second receptors wherein each receptor includes,
  (1) two opposite parallel planes spaced apart by a predetermined distance whereby the separation distance allows for the generation of a signal representative of the particle acceleration of the fluid, and
  (2) an array of detectors mounted on each said parallel plane to form a matrix, each said detector producing a detector signal in response to an applied acoustic pressure, said first receptor fixed in a position that defines the direction of the farfield pressure intensity to be measured, and said second receptor varying in position; and
(b) a processing unit connected to said antenna and responsive to the detector signals from said antenna, for generating the farfield pressure intensity in a given direction from the nearfield pressure measurements, said processing unit including,
  (1) a signal conditioning means associated with each receptor, for generating the farfield pressure contribution for the acoustic energy received by each receptor, each said signal conditioning means including,
    (i) a means connected to said receptor and responsive to the detector signals, for generating a planar average pressure signal for the acoustic energy received by each plane of each receptor from the summed together detector signals generated by each detector in each plane,
    (ii) a means responsive to the planar average pressure signal from a receptor, for generating a receptor average pressure signal representative of the average value of the acoustic pressure between the planes of the receptor,
    (iii) a means for generating the time derivative of the receptor average pressure signal,
    (iv) a subtracting means responsive to the planar average value signals, for generating the difference between the planar average pressure signals of each plane of the receptor, the output signal from said subtracting means comprising the average particle acceleration of the fluid generated by the source, and
    (v) a summation means responsive to said derivative means and said subtracting means, for summing together the derivative of the receptor average pressure signal and the average particle acceleration signal, the output from said summation means comprising the farfield pressure contribution for the acoustic energy received by the receptor, and
  (2) a multiplying means connected to the outputs of said signal conditioning means, for generating the time average from the results of the multiplication of the farfield pressure contribution signals from each receptor, and
  (3) an adder, for adding together the output signals from said multiplying means obtained at each position of said second receptor, the added together signals forming the farfield pressure intensity of the source in the chosen direction.

17. The apparatus of claim 16 wherein said summation means associated with said second receptor further includes a time delay generatory for time delaying the output signal from said summation means, said time delay providing phase compensation between said first and second receptors when said receptors are at different distances from the source.

18. The apparatus according to claims 16, or 17 wherein each said signal conditioning means further includes a plurality of electrical delay lines, for electrically time delaying the detector signals for a detector or groups of detectors in a given planar array thereby generating an electrical rotationof the chosen direction of the farfield pressure intensity to be measured.

19. An apparatus for obtaining the farfield pressure intensity field in a given direction of a sonorous source placed in a fluid medium from pressure measurements taken in the nearfield of the source, the apparatus comprising:

(a) an acoustic antenna positioned close to the source and responsive to the acoustic pressure generated in the fluid by the source, for generating electrical signals characteristic of the pressure produced by the source in its nearfield, said antenna having first and second receptors wherein each receptor includes,
  (1) two opposite parallel planes spaced apart by a predetermined distance whereby the separation distance allows for the generation of a signal representative of the particle acceleration of the fluid, and
  (2) an array of detectors mounted on each said parallel plane to form a matrix, each said detector producing a detector signal in response to an applied acoustic pressure,
  said first receptor fixed in a position that defines the direction of the farfield pressure intensity to be measured, and said second receptor varying in position; and
(b) a processing unit connected to said antenna and responsive to the detector signals from said antenna, for generating the farfield pressure intensity in a given direction from the nearfield pressure measurements, said processing unit including,
  (1) a signal conditioning means associated with each receptor, for generating the farfield pressure contribution for the acoustic energy received by each receptor, each said signal conditioning means including,
    (i) a means connected to said receptor and responsive to the detector signals, for generating a planar average pressure signal for the acoustic energy received by each plane of each receptor from the summed together detector signals generated by each detector in each plane,
    (ii) a means responsive to the planar average pressure signal from a receptor, for generating a receptor average pressure signal representative of the average value of the acoustic pressure between the planes of the receptor,
    (iii) a subtracting means, for generating the difference between the planar average pressure signals of each plane of the receptor, the output signal from said subtracting means comprising the average particle acceleration of the fluid generated by the source, (iv) an integrator for integrating the average particle acceleration signal to obtain the average particle velocity, and (v) a product averaging means, for obtaining the time average value of the product of the average particle velocity signal and the receptor average pressure signal to obtain the farfield pressure intensity contribution signal from the acoustic energy received by the receptor, and (2) an adder, for adding together the output signals from said multiplying means obtained at each position of said second receptor, the added together signals forming the farfield pressure intensity of the source in the chosen direction.

20. The apparatus according to claim 19 wherein each said signal conditioning means further includes a plurality of electrical delay lines, for electrically time delaying the detector signals for a detector or groups of detectors in a given planar array thereby generating an electrical rotation of the chosen direction of the farfield pressure intensity to be measured.

* * * * *